(12) United States Patent
Sun

(10) Patent No.: US 7,446,066 B1
(45) Date of Patent: Nov. 4, 2008

(54) REVERSE REACTION SINTERING OF SI$_3$N$_4$/SIC COMPOSITES

(76) Inventor: Jai-Lin Sun, Suite 2201, BUST Building 49, 30 Xuanyuan Road, Haidian District, Beijing (CN) 100083

( * ) Notice: Subject to any disclaimer, the term of this patent is extended or adjusted under 35 U.S.C. 154(b) by 142 days.

(21) Appl. No.: 11/279,461

(22) Filed: Apr. 12, 2006

Related U.S. Application Data

(60) Provisional application No. 60/597,049, filed on Nov. 7, 2005.

(51) Int. Cl.
*C04B 35/577* (2006.01)
*C04B 35/596* (2006.01)
*B32B 18/00* (2006.01)

(52) U.S. Cl. .................. 501/92; 501/96.5; 501/97.4; 428/325; 428/331; 428/404; 428/406; 428/698

(58) Field of Classification Search ............... 501/92, 501/96.5, 97.4; 428/325, 331, 404, 406, 428/698
See application file for complete search history.

(56) References Cited

U.S. PATENT DOCUMENTS

| | | | |
|---|---|---|---|
| 3,193,399 A | | 7/1965 | Washburn |
| 4,747,984 A | | 5/1988 | Soma et al. |
| 4,829,027 A | | 5/1989 | Cutler et al. |
| 4,987,104 A | | 1/1991 | Trigg |
| 5,082,806 A | * | 1/1992 | Dulin ............... 501/92 |
| 5,459,112 A | * | 10/1995 | Kim ............... 501/89 |
| 5,503,122 A | | 4/1996 | Ritland et al. |
| 5,504,046 A | * | 4/1996 | Kim ............... 501/92 |
| 5,525,374 A | | 6/1996 | Ritland et al. |
| 5,563,108 A | * | 10/1996 | Kim ............... 501/89 |
| 5,626,914 A | | 5/1997 | Ritland et al. |
| 5,676,907 A | | 10/1997 | Ritland et al. |
| 5,767,025 A | | 6/1998 | Miyake et al. |
| 5,912,200 A | | 6/1999 | Miyake et al. |
| 5,962,103 A | | 10/1999 | Luthra et al. |
| 5,980,699 A | | 11/1999 | Timmons et al. |
| 6,110,853 A | | 8/2000 | Berger et al. |
| 6,133,180 A | | 10/2000 | Miyake et al. |
| 6,261,511 B1 | | 7/2001 | Miyake et al. |
| 6,350,713 B1 | | 2/2002 | Petrak |
| 6,410,468 B2 | | 6/2002 | Nakahata et al. |
| 6,649,270 B2 | * | 11/2003 | Kinoshita et al. ........... 428/446 |
| 6,916,560 B2 | * | 7/2005 | Wotting et al. ............. 428/698 |
| 2006/0281625 A1 | * | 12/2006 | Kinoshita et al. ............ 501/92 |

FOREIGN PATENT DOCUMENTS

| | | | |
|---|---|---|---|
| EP | 1767885 | * | 3/2007 |
| JP | 4-114969 | * | 4/1992 |

* cited by examiner

*Primary Examiner*—Karl E Group
(74) *Attorney, Agent, or Firm*—C. John Brannon; Brannon & Associates PC

(57) ABSTRACT

A method of making a composite sintered silicon nitride/silicon carbide body, including mixing a predetermined amount of silicon nitride powder with a predetermined amount of silicon carbide powder, heat-treating the resultant mixed powder at a temperature of between about 800 and 1500 degrees Celsius in a substantially nitrogen sintering atmosphere, and producing a thin film of silica around individual silicon nitride and silicon carbide grains. The thin film of silica is useful in retarding the diffusion of oxygen to the silicon nitride particles, slowing their oxidation. The pressure of the sintering atmosphere is not substantially greater than atmospheric pressure.

14 Claims, 11 Drawing Sheets

REVERSE REACTION SINTERING OF SI₃N₄/SIC COMPOSITES

CROSS-REFERENCE TO RELATED APPLICATIONS

This application claims priority to U.S. Provisional Patent Application Ser. No. 60/597,049, filed Nov. 7, 2005.

BACKGROUND OF THE INVENTION

Polycrystalline silicon nitride ($Si_3N_4$) bodies are becoming increasingly attractive as structural and mechanical materials due to their ability to provide high strength and durability under severe conditions, and especially under high temperature applications. $Si_3N_4$ is characterized by high heat resistance, mechanical strength, thermal shock resistance, wear resistance, chemical stability, and hardness. One reason that $Si_3N_4$ does not enjoy wider use is that $Si_3N_4$ green powder compacts or green bodies are inherently difficult to sinter.

Known processes for producing a sintered silicon nitride body typically require the use of a sintering aid, such as $Y_2O_3$, $Al_2O_3$, MgO, or the like, added to a raw material powder of silicon nitride and a high-pressure $N_2$ atmosphere or $N_2$/inert gas atmosphere under which the $Si_3N_4$ body is sintered. Typically, the sintering aids form a grain boundary liquid during sintering, and more typically this liquid includes $SiO_2$, either contributed as an impurity present in the $Si_3N_4$ or generated by the oxidation of $Si_3N_4$ by oxygen present in the sintering atmosphere.

The grain boundary liquid thus serves as a sintering aid and forms a silica-based glass in grain boundaries. This glass aids in the densification of the silicon nitride powder green body and in the formation of a fine grain structure in the resulting sintered body. However, the relative amounts of O and N in the glass phase is an uncontrolled variable varies, and thus the composition of the glassy phase at the grain boundary is likewise uncontrolled and variable, resulting in density gradients in the sintered body and compositional gradients at the grain boundaries.

Various additives have been added to improve the mechanical strength of the sintered ceramic bodies to enable them to perform under severe conditions. Silicon carbide (SiC) has been found to provide increased resistance to oxidation and mechanical strength at high temperatures to $Si_3N_4$. However, sintered ceramics composites produced as described above from a mixture of silicon nitride and silicon carbide powders typically contain silicon carbide particles on the order of microns only in the grain boundaries of silicon nitride particles. Attempts have been made to prevent the segregation of SiC in the grain boundaries of the sintered body. For instance, a composite sintered body of silicon nitride and silicon carbide was made by mixing a silicon nitride powder with a fine silicon carbide powder having an average diameter of 0.03 .mu.m and a specific surface area of 30 m.sup.2/g and an yttria to form a green body which was sintered at 1750-1900° C. in a pressurized nitrogen atmosphere of 1 MPa; the body was further subjected it to an HIP treatment at 1750° C. in a 100 MPa nitrogen atmosphere. However, such a technique requires a bimodal PSD in the starting mixture of $Si_3N_4$ and SIC powders, and thus it is impossible to achieve a uniform mixture, resulting in a sintered body with an uneven grain structure. Further, the bimodal PSD of the main constituent powders makes an even, uniform distribution of the yttria sintering aid unlikely, resulting in insufficient sinterability and poor mechanical strength in the resultant sintered body.

Another technique for the production of a $Si_3N_4$/SiC body involves mixing a silicon metal powder, a silicon carbide powder and a sintering aid powder, forming the mixture into a green body, sintering the green body in a nitrogen atmosphere to react the metallic silicon with nitrogen to form $Si_3N_4$ which functions to bond SiC particles, and then elevating the temperature to further sinter the body via the sintering aid. Because metallic silicon is used instead of a silicon nitride powder as a starting material, shrinkage during sintering is minimized. However, this technique suffers from the difficulty in uniformly nitriding the silicon metal from the surface to the core of the body, which typically results in at least some silicon metal unreacted inside the resulting sintered body.

Yet another technique involves heat-treating a mixture of an organosilicon polymer and silicon powder in a non-oxidizing atmosphere, such as $N_2$, and pulverizing it to form a silicacious powder characterized by a surface covered with an amorphous material consisting of silicon and carbon. The powder is formed into a green body and sintered in an $N_2$ atmosphere. However, as with the previously-descried technique, it is difficult to uniformly nitride the body from surface to interior.

Partially crystalline composite powders of silicon nitride and silicon carbide have been produced as starting materials, mixed with a sintering aid powder and formed into green bodies which have been heated to the 1400-1600 degree Celsius range for a first sintering/reaction step and then liquid phase sintered in the 1600-2300 degree Celsius range. However, the resulting sintered body typically suffers from the generation of pores and the deterioration of mechanical properties by decomposition of amorphous components. Further, full density cannot be achieved via this technique absent elevated gas-pressure during sintering. Also, since a sintering aid powder is mixed with the partially crystalline composite powder and then sintered, the dispersion of the sintering aid powder is typically uneven, resulting in segregation of the sintering aid and inconsistent density and other physical properties observed in the sintered body.

Finally, a process of manufacturing a composite powder for the manufacture of a composite sintered body of silicon nitride and silicon carbide includes the steps of mixing silicon metal powder and carbonaceous powder together, heating the resultant mixture in an inert gas atmosphere, such as nitrogen, at a temperature of 1,400 degrees Celsius to simultaneously carbonize and nitride the silicon metal powder. However, this technique suffers from the preferential formation of β-silicon nitride, making it difficult to increase the percentage of α-silicon nitride in the composite powder. Since β-silicon nitride tends to grow in a needle shape, the resultant powder is suffers from the anisotropic particle shapes and is thus difficult to compact or pulverize.

There thus remains a need for a technique for evenly sintering a $Si_3N_4$/SiC body to density that does not require a pressurized nitrogen atmosphere and/or excessively high firing temperatures, as both requirements greatly increase the expense of the process and, thus, the end product. The present invention addresses this need.

SUMMARY OF THE INVENTION

A silica film is produced around $Si_3N_4$ and SiC particles present in a green body via oxidation at high temperature and is relatively thin and stable, allowing for control of oxidation of the particles during sintering in air or other primarily nitrogen or inert gas mixture having a relatively minor oxygen component, and under standard atmospheric or slightly to moderately elevated pressures. The production of a quantity of active oxide, allows for the avoidance of excessive oxidation and the simultaneous sintering of the body. The guiding principle is one of thermodynamics. $Si_3N_4/SiC$ composites are thus feasible in terms of thermodynamics. Better sintering can be achieved via controlling the temperature ramp rate and atmosphere during the process of sintering. A typical sintering temperature range is about 800 to about 1500 degrees Celsius; more typically, the sintering range is between about 800 and about 1200 degrees Celsius, wherein control of oxidation of nitrogen and nitrogen-containing compounds may be maintained. Typically, the bodies are soaked at about 1200 degrees Celsius to avoid excessive decomposition of the nitride. Sintering below the high temperature of 1500 degrees Celsius allows for the so-produced compact $Si_3N_4/SiC$ composite of better quality.

The microstructure of products which made by sintering SiC—$Si_3N_4$ blends in the above temperature ranges show:

1. The main composition of the matrix of SiC—$Si_3N_4$ system after sintering are $SiO_2$ and $Si_2N_2O$, and the $Si_3N_4$ in the matrix is mostly decomposed; however, the compact strength is still high.

2. The main composition of the matrix of SiC—$Si_3N_4$—Si system after sintering are $SiO_2$, $Si_2N_2O$ and metallic silicon, the crystal morphology of $Si_2N_2O$ is fine and small, and the ratio of remnant nitrogen is higher.

3. The main composition of the matrix of SiC—$Si_3N_4$—$SiO_2$ system after sintered are $SiO_2$ and $Si_2N_2O$. The $Si_2N_2O$ crystals on the surface grow better, but $Si_2N_2O$ crystals in the interior are still present, but smaller. The compact strength is high and the ratio of remnant nitrogen is higher.

One object of the present invention is to provide a method for sintering SiC—$Si_3N_4$ at ambient pressure and in air. Related objects and advantages of the present invention will be apparent from the following description.

DESCRIPTION OF THE PREFERRED EMBODIMENTS

Figure 1:
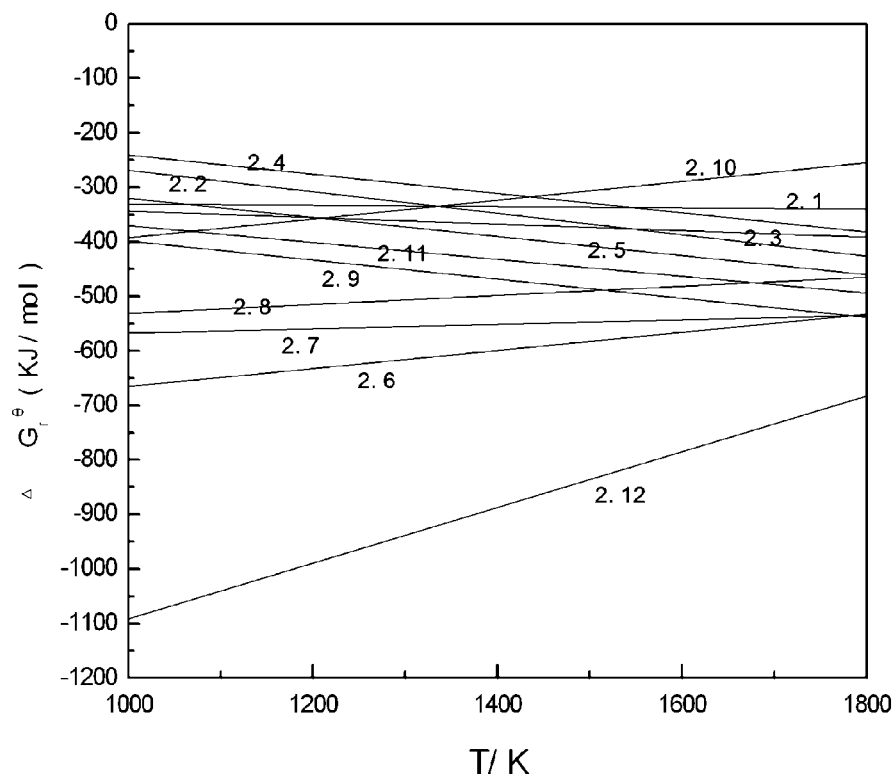
FIG. 1 is a graphical illustration of a plot of standard free energy vs. absolute temperature for several oxidation reactions within the silicon-carbon-oxygen-nitrogen system.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Oxidation of SiC

When SiC particles are exposed to an oxygen-containing environment at elevated temperatures, a surface film of $SiO_2$ may form on the SiC particles through the partial oxidation of the SiC. The $SiO_2$ film acts as a protective film preventing the complete oxidation of the SIC, since, unless the environment is very rich in oxygen, oxygen diffusion through the silica film is very slow, even at elevated temperatures. As the system typically contains, in addition to silicon carbide, metal silicon, carbon and silica, the actual reaction kinetics are influenced by the relative amounts of C, SiC, Si, and $SiO_2$.

In the above system, SiC is decomposed into SiO (g), and SiO (g) is further oxidized into $SiO_2(s)$. The speed of decomposition and oxidation of SiC is a function of the composition of temperature and the sintering atmosphere. The reaction may be described thermodynamically as follows.

$$SiC(s)+O_2(g)=Si(s)+CO_2(g)$$

$$\Delta_r G^\ominus_1 = -318560-12.1\{T\}_K (\text{J·mol}^{-1}) \qquad 2.1$$

$$2SiC(s)+O_2(g)=2Si(s)+2CO(g)$$

$$\Delta_r G^\ominus_2 = -72772-196.2\{T\}_K (\text{J·mol}^{-1}) \qquad 2.2$$

$$2/3SiC(s)+O_2(g)=2/3SiO(g)+2/3CO_2(g)$$

$$\Delta_r G^\ominus_3 = -284610-59.4\{T\}_K (\text{J·mol}^{-1}) \qquad 2.3$$

$$2SiC(s)+O_2(g)=2SiO(g)+2C(s)$$

$$\Delta_r G^\ominus_4 = -64728-176.2\{T\}_K (\text{J·mol}^{-1}) \qquad 2.4$$

$$SiC(s)+O_2(g)=SiO(g)+CO(g)$$

$$\Delta_r G^\ominus_5 = -144740 - 175.1\{T\}_K \,(\text{J}\cdot\text{mol}^{-1}) \quad (2.5)$$

$$SiC(s) + O_2(g) = SiO_2(s) + C(s)$$

$$\Delta_r G^\ominus_6 = -832680 + 166.6\{T\}_K \,(\text{J}\cdot\text{mol}^{-1}) \quad (2.6)$$

$$2/3SiC(s) + O_2(g) = 2/3SiO_2(s) + 2/3CO(g)$$

$$\Delta_r G^\ominus_7 = -630033 - 53.1\{T\}_K \,(\text{J}\cdot\text{mol}^{-1}) \quad (2.7)$$

$$1/2SiC(s) + O_2(g) = 1/2SiO_2(s) + 1/2CO_2(g)$$

$$\Delta_r G^\ominus_8 = -613600 + 82.8\{T\}_K \,(\text{J}\cdot\text{mol}^{-1}) \quad (2.8)$$

$$2C(s) + O_2(g) = 2CO(g)$$

$$\Delta_r G^\ominus_9 = -224760 - 174.1\{T\}_K \,(\text{J}\cdot\text{mol}^{-1}) \quad (2.9)$$

$$2CO(g) + O_2(g) = 2CO_2(g)$$

$$\Delta_r G^\ominus_{10} = -564350 + 172\{T\}_K \,(\text{J}\cdot\text{mol}^{-1}) \quad (2.10)$$

$$2Si(s) + O_2(g) = 2SiO(g)$$

$$\Delta_r G^\ominus_{11} = -216710 - 154.1\{T\}_K \,(\text{J}\cdot\text{mol}^{-1}) \quad (2.11)$$

$$2SiO(g) + O_2(g) = 2SiO_2(s)$$

$$\Delta_r G^\ominus_{12} = -1600600 + 509.5\{T\}_K \,(\text{J}\cdot\text{mol}^{-1})$$

$$SiC(s) = Si(s) + C(s)$$

$$\Delta_r G^\ominus_{13} = 75992 - 11.1\{T\}_K \,(\text{J}\cdot\text{mol}^{-1}) \quad (2.13)$$

It is evident that the value of $\Delta_r G^\ominus$ in reaction 2.13 is positive between 1000 and 1800 K, and thus the reaction cannot proceed. FIG. 1 is made according to the relation of $\Delta_r G^\ominus$ and temperature in the scope of 1000 and 1800 K. Regarding FIG. 1, it can be seen that under the standard state or at an oxygen partial pressure of 0.1 Mpa, the value of □$\Delta_r G^\ominus$ in all reactions within the scope of temperature are negative, so the reactions can proceed. Accordingly, the value of $\Delta_r G^\ominus$ in reaction 2.12 is the most negative, and those in reactions 2.6, 2.7, 2.8, and 2.9 also relatively large negative values; thus the oxidation of SiC will proceed according to these reactions, the products of which are mainly $SiO_2$ and the gases $CO_2$ and CO.

The oxidation of SiC is influenced by many factors, such as the reaction temperature, sintering atmosphere, the composition of binding agent and crystal structure, diffusion speed of the various species taking part in the reactions, the particle size of the SiC, the particle size distribution, and the like. The oxidation of SiC may be envisioned as a multi-phase reaction, with $O_2$ as a diffusing phase and SiC as a fixed phase. The oxidation process is thus dependent on the diffusion of $O_2$ to the SiC and the reaction of $O_2$ at the SiC interface. Assuming a body formed primarily of SiC particles, the oxygen arrives at the SiC particle surface by a diffusion mechanism and reacts, forming the film of $SiO_2$. Once the silica film is established, additional oxygen must pass through the silica film to reach the SiC interface to further react therewith; thus, the diffusion of oxygen through the silica film becomes rate limiting. Meanwhile, the gaseous species $CO_2$, CO and/or SiO that are likewise produced must pass through the silica film. In other words, $CO_2$, CO and/or SiO are emitted by reverse diffusion, which also influence the diffusion of oxygen to the SiC interface. Thus, beyond the initial forming of the silica film, the rate of the oxidation of SiC is mainly controlled by diffusion of the various gaseous species through the silica film. Thus the oxidation speed has close relationship with the structure of product layers, the degree of compaction of the body, the oxidation temperature and time, and the property of the diffusion matter. Additionally, the multi-crystal transformation from α-silica to β-silica also impacts the diffusion of $O_2$ therethrough as well as having an effect on the compaction of the body, thus influencing the oxidation rate of the SiC particles.

Oxidation of $Si_3N_4$ $Si_3N_4$ is a non-oxide, and is thus easily oxidized at high temperatures. The oxidation behavior of $Si_3N_4$ and its products are dependent upon the ambient oxygen partial pressure: under high oxygen partial pressures, the oxidation products of $Si_3N_4$ are mainly $SiO_2$ and $N_2$, along with small amounts of $Si_2N_2O$ (g) and NO (g); under low oxygen partial pressures, the main oxidation products are solid $SiO_2$ and gaseous SiO, with small amounts of $N_2$ (g). According to thermodynamics, the oxidation reactions of $Si_3N_4$ under high temperatures may be expressed as follows:

$$1/3Si_3N_4(s) + O_2(g) = SiO_2(s) + 2/3N_2(g)$$

$$\Delta_r G^\ominus_1 = -657533 + 64.1\{T\}_K \,(\text{J}\cdot\text{mol}^{-1}) \quad (2.14)$$

$$1/5Si_3N_4(s) + O_2(g) = 3/5SiO_2(s) + 4/5NO(g)$$

$$\Delta_r G^\ominus_2 = -322260 + 28.4\{T\}_K \,(\text{J}\cdot\text{mol}^{-1}) \quad (2.15)$$

$$2/3Si_3N_4(s) + O_2(g) = 2SiO(g) + 4/3N_2(g)$$

$$\Delta_r G^\ominus_3 = 285360 - 381.3\{T\}_K \,(\text{J}\cdot\text{mol}^{-1}) \quad (2.16)$$

$$2/7Si_3N_4(s) + O_2(g) = 6/7SiO(g) + 8/7NO(g)$$

$$\Delta_r G^\ominus_4 = 225606 - 177.8\{T\}_K \,(\text{J}\cdot\text{mol}^{-1}) \quad (2.17)$$

$$4/3Si_3N_4(s) + O_2(g) = 2Si_2N_2O(s) + 2/3N_2(g)$$

$$\Delta_r G^\ominus_5 = -842547 + 38.2\{T\}_K \,(\text{J}\cdot\text{mol}^{-1}) \quad (2.18)$$

$$4/5Si_3N_4(s) + O_2(g) = 6/5Si_2N_2O(s) + 4/5NO(g)$$

$$\Delta_r G^\ominus_6 = -424760 + 13\{T\}_K \,(\text{J}\cdot\text{mol}^{-1}) \quad (2.19)$$

$$2/3Si_2N_2O(s) + O_2(g) = 4/3SiO_2(s) + 2/3N_2(g)$$

$$\Delta_r G^\ominus_7 = -602080 + 79.6\{T\}_K \,(\text{J}\cdot\text{mol}^{-1}) \quad (2.20)$$

$$SiO_2(s) = Si(s) + O_2(g)$$

$$\Delta_r G^\ominus_8 = 908670 - 177.7\{T\}_K \,(\text{J}\cdot\text{mol}^{-1}) \quad (2.21)$$

$$Si_3N_4(s) = 3Si(s) + 2N_2(g)$$

$$\Delta_r G^\ominus_9 = 753100 - 340.8\{T\}_K \,(\text{J}\cdot\text{mol}^{-1}) \quad (2.22)$$

$$2Si_2N_2O(s) = 4Si(s) + 2N_2(g) + O_2(g)$$

$$\Delta_r G^\ominus_{10} = 1834100 - 488.1\{T\}_K \,(\text{J}\cdot\text{mol}^{-1}) \quad (2.23)$$

Figure 2:
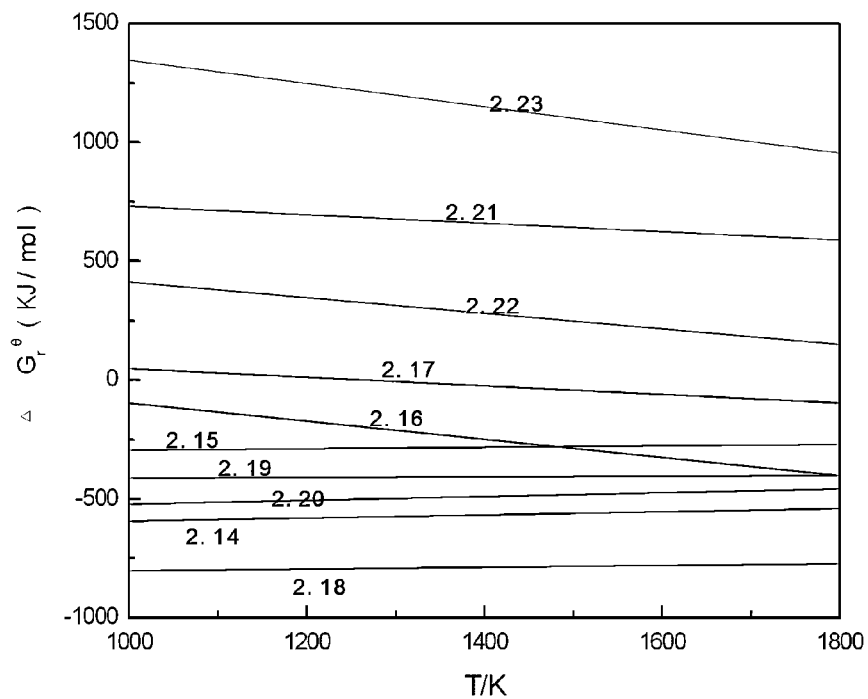
FIG. 2 is a graphical illustration of a plot of standard free energy vs. absolute temperature for several other oxidation reactions within the silicon-carbon-oxygen-nitrogen system.

FIG. 2 expresses the relationship of $\Delta_r G^\ominus$ in the above reactions and temperature between 1000 and 1800 K. It can be seen in FIG. 2 that under the standard state or at the oxygen partial pressure of 0.1 Mpa, the value of $\Delta_r G^\ominus$ in reaction 2.21, 2.22, and 2.23 are all positive and thus the three reactions cannot proceed. Reaction 2.17 may proceed when the temperature exceeds 1269 K; the value of $\Delta_r G^\ominus$ in the other reactions in this temperature range are all negative, and thus reactions 2.19 and 2.20 may proceed. Under high oxygen partial pressures, the oxidation of $Si_3N_4$ can occur basically according to the above four reactions, with the products being mainly $SiO_2$ and $N_2$. If the oxygen partial pressure is in the lower range, the gases of $Si_2N_2O$ and NO may likewise be produced in significant quantities. The relationship of condensed phase and gas phase in the Si—N—O system and the balanced oxygen partial pressure in gas phase may be expressed as follows:

$$Si(s)+O_2(g)=SiO_2(s)$$

$$\lg(p_{O2}/p^\ominus)=-22.449 \qquad 2.24$$

$$3Si(s)+2N_2(g)=Si_3N_4(s)$$

$$\lg(p_{N2}/p^\ominus)=-4.341 \qquad 2.25$$

$$4Si_3N_4(s)+3O_2(g)=6Si_2N_2O(s)+2N_2(g)$$

$$\lg(p_{N2}/p^\ominus)=3/31 \lg(p_{O2}/p^\ominus)+37.616 \qquad 2.26$$

$$2Si_2N_2O(s)=4Si(s)+2N_2(g)+O_2(g)$$

$$\lg(p_{N2}/p)=-1/21 \lg(p_{O2}/p^\ominus)-18.326 \qquad 2.27$$

$$2Si_2N_2O(s)+3O_2(g)=4SiO_2(s)+2N_2(g)$$

$$\lg(p_{N2}/p^\ominus)=3/21 \lg(p_{O2}/p^\ominus)+26.572 \qquad 2.28$$

$$Si_3N_4(s)+3O_2(g)=3SiO_2(s)+2N_2(g)$$

$$\lg(p_{N2}/p^\ominus)=3/21 \lg(p_{O2}/p^\ominus)+29.333 \qquad 2.29$$

Figure 3:
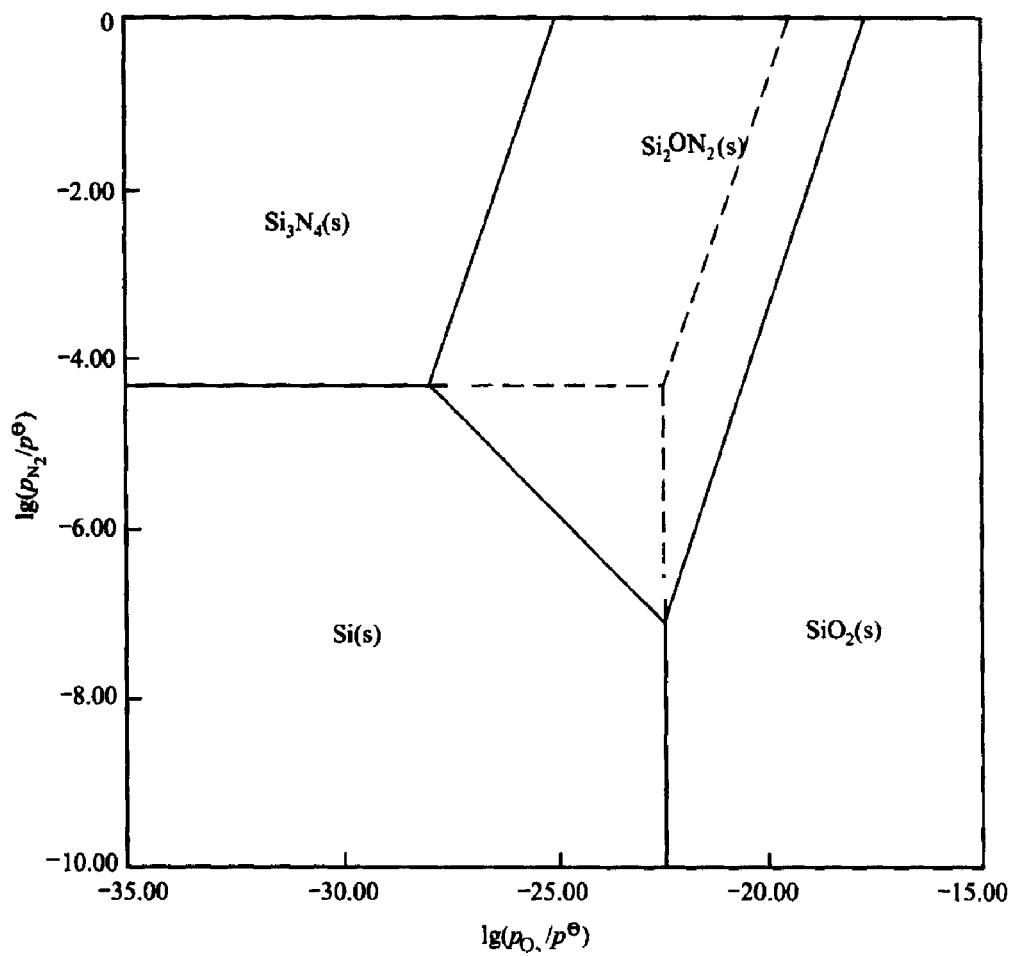
FIG. 3 is a phase diagram of the Si—N—O system at 1800 Kelvin

From the above relationships, it can be seen that the reaction in the interface of $Si_3N_4$ and $SiO_2$ may proceed as follows, producing $Si_2N_2O$ (FIG. 3):

$$4Si_3N_4(s)+3O_2(g)=6Si_2N_2O(s)+2N_2(g)$$

or $Si_3N_4(s)+SiO_2(s)=2Si_2N_2O(s)$

Oxidation of $Si_2N_2O$

Theoretically, $Si_2N_2O$ may be totally oxidized under an oxidizing atmosphere (without the protection of the silica film) if the reaction is allowed to proceed for a sufficiently long time. Under the oxidizing atmosphere (i.e., a high oxygen partial pressure), the product of oxidation is mainly $SiO_2$ and the gas phase is mainly $N_2$ without substantial SiO gas. But under low oxygen partial pressure, the gas phases in the products of oxidation are mainly SiO gas and a little $N_2$. The above thermodynamics calculation results of equations 2.16 and 2.29 can be seen and as following equation 2.30:

$$1/3Si_3N_4(s)+O_2(g)=SiO_2(s)+2/3N_2(g)$$

$$\Delta_r G^\ominus=-663776.7+69.31\{T\}_K (\text{J·mol}^{-1}) \qquad 2.30$$

To sum up, the oxidation of $Si_3N_4$ can produce the different results according to the different temperature and oxygen partial pressure conditions. At high temperature and under an oxidizing atmosphere, the oxidation reactions of $Si_3N_4$ are as follows:

$$Si_3N_4(s)+3O_2(g)=3SiO_2(s)+2N_2(g)$$

$$4Si_3N_4(s)+3O_2(g)=6Si_2N_2O(s)+2N_2(g) \text{ and}$$

$$2Si_2N_2O(s)+3O_2(g)=4SiO_2(s)+2N_2(g)$$

So the above reactions can proceed at high temperature and under oxidizing conditions. At high temperature and under low oxygen partial pressure, the oxidation reaction of $Si_3N_4$ is as follows:

$$Si3N4(s)+3/2O2(g)=3SiO(g)+2N2(g)$$

In addition to this, there is also $$4Si3N4(s)+3O2(g)=6Si2N2O(s)+2N2(g)$$

which should be avoided during the sintering process.

The Si3N4/SiC System

In the $Si_3N_4$/SiC multi-phase system, in addition to above oxidation reactions of SiC and $Si_3N_4$, other reactions may occur, which are as follows:

$$SiO_2(s)+CO(g)=SiO(g)+CO_2(g)$$

$$\Delta_r G^\ominus_1=517960-168.7\{T\}_K (\text{J·mol}^{-1}) \qquad 2.31$$

$$1/6Si_3N_4(s)+CO(g)=1/2SiO_2(s)+1/3N_2(g)+C$$

$$\Delta_r G^\ominus_2=-21643+119.1\{T\}_K (\text{J·mol}^{-1}) \qquad 2.32$$

$$1/2SiC(s)+CO(g)=1/2SiO_2(s)+3/2C(s)$$

$$\Delta_r G^\ominus_3=-304280+171.2\{T\}_K (\text{J·mol}^{-1}) \qquad 2.33$$

$$SiC(s)+CO_2(g)=SiO_2(s)+2C(s)$$

$$\Delta_r G^\ominus_4=-437210+167.1\{T\}_K (\text{J·mol}^{-1}) \qquad 2.34$$

$$1/3Si_3N_4+CO_2(g)=SiO_2+C+2/3N_2(g)$$

$$\Delta_r G^\ominus_5=-262+64.5\{T\}_K (\text{J·mol}^{-1}) \qquad 2.35$$

$$1/2SiO_2(s)+SiO(g)+N_2(g)=1/2Si_3N_4(s)+O_2(g)$$

$$\Delta_r G^\ominus_6=186140+158.6\{T\}_K (\text{J·mol}^{-1}) \qquad 2.36$$

$$3/2SiC(s)+N_2(g)=1/2Si_3N_4(s)+3/2C(s)$$

$$\Delta_r G^\ominus_7=-262565+153.8\{T\}_K (\text{J·mol}^{-1}) \qquad 2.37$$

$$3/2SiO_2+N_2(g)=1/2Si_3N_4+3/2O_2(g)$$

$$\Delta_r G^\ominus_8=984600-95.3\{T\}_K (\text{J·mol}^{-1}) \qquad 2.38$$

Figure 4:
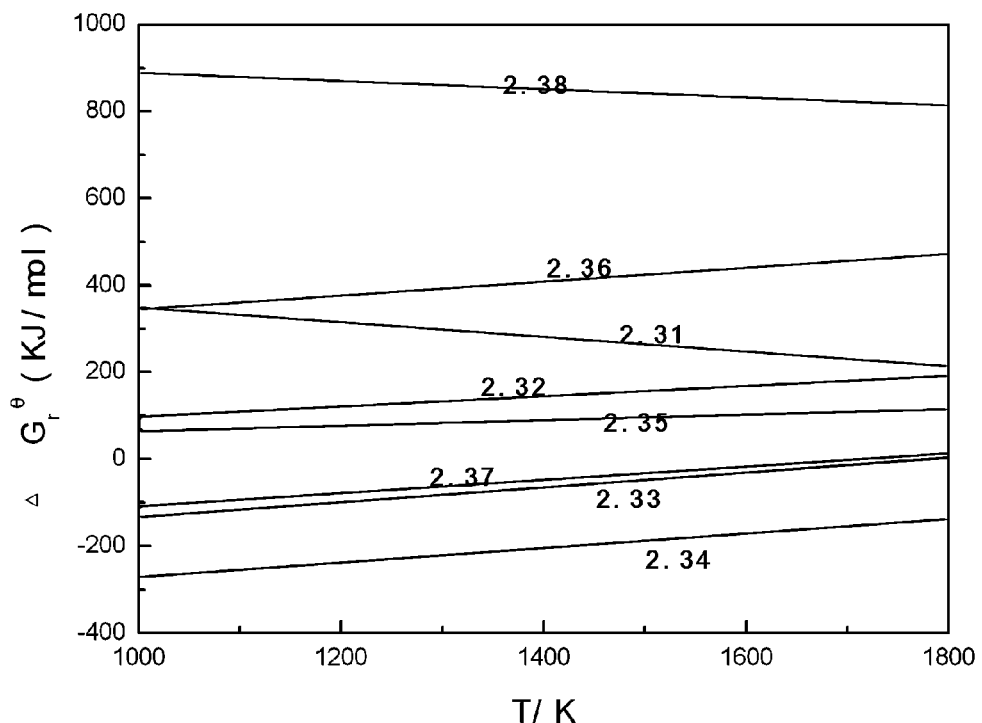
FIG. 4 is a graphical illustration of a plot of standard free energy vs. absolute temperature for several sintering/oxidation reactions within the silicon-carbon-oxygen-nitrogen system.

FIG. 4 illustrates the relationship of $\Delta_r G^\ominus$ in above reactions and temperature between 1000 and 1800 K. FIG. 4 shows that under the standard state or at high oxygen partial pressure, only the value of $\Delta_r G^\ominus$ in reaction 2.34 within this temperature range is negative, and thus may proceed. Reaction 2.33 may proceed when the temperature is below 1778 K, and reaction 2.37 may proceed when the temperature is below 1707 K. For other five reactions, $\Delta_r G^\ominus$ is positive in the temperature range from 1000 to 1800 K, and thus the reactions cannot proceed. In other words, from the point of view of thermodynamics, SiC may possibly be reacted with $CO_2$ and a little CO to produce $SiO_2$ and C; SiC may also be reacted with $N_2$ (produced by the oxidation of $Si_3N_4$) to produce $Si_3N_4$ and C. Certainly, C thus produced may be further oxidized into $CO_2$ and CO under the oxidizing atmosphere.

The Oxidizing Sequence of $Si_3N_4$ and SiC when Sintered.

Figure 5:
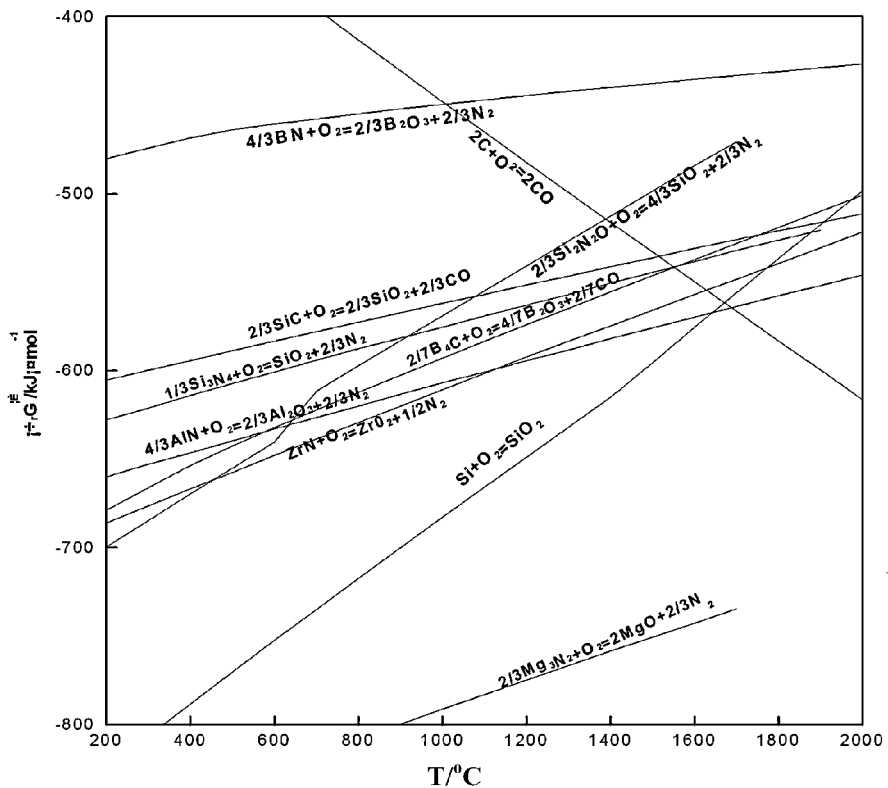
FIG. 5 is a graphical illustration of a plot of standard free energy vs. Celsius temperature for several regular non-oxide materials.

Referring to FIG. 5, it can be seen that $Si_3N_4$ will be oxidized before SiC within the sintering temperature range. As discussed above, $Si_3N_4$ reacts with oxygen as expressed in reactions 2.30, 2.26 and 2.16, which may proceed depending on the oxygen partial pressure. From FIG. 3, it can be seen that when $p_{O_2}$ is relatively low, $Si_2N_2O$ is first produced, and the reaction product is $SiO_2$ with rising $p_{O_2}$. Regarding SiO, because it is a gaseous compound, the discussion may be carried out through the relationship of SiO and $SiO_2$.

$$SiO(g) + \frac{1}{2}O_2(g) \, SiO_2(s)$$

$$\Delta_r G^\ominus = -812140 - 325.18\{T\}_K (J \cdot mol^{-1}) \qquad 2.39$$

$$\Delta_r G = \Delta_r G^\ominus - RT \ln(p_{SiO}/p^\ominus) \cdot (p_{O_2}/p^\ominus)^{1/2} \qquad 2.40$$

When $p_{O_2}$ is higher, the negative value is increased, $\Delta_r G < 0$ and the reaction can be carried out toward the direction of producing $SiO_2$; when $p_{O_2}$ is lower, $\Delta_r G > 0$ and SiO is produced. SiO is a gaseous compound and, once produced, can be volatilized out, especially when $p_{O_2}$ is lower than convertible oxygen partial pressure. Thus, SiO can reach the outside pressure and be volatilized rapidly. In this process, $SiO_2$ is expected as the produced surface layer and $SiO_2$ or $Si_2N_2O$ are at the inner particulate interface; SiO is not expected to form and be volatilized. Thus, the reactions must be carried out under higher $p_{O_2}$.

The Stability of the Surface Film of $SiO_2$ $SiO_2$ is in the compact contacting state with $Si_3N_4$ and SiC, so the reaction between them must be considered.

$$1/3Si_3N_4 + SiO_2 = 2SiO(g) + 2/3N_2(g)$$

$$\Delta_r G^\ominus = 931363 - 442.25\{T\}_K (J \cdot mol^{-1}) \qquad 2.41$$

$$\Delta_r G = \Delta_r G^\ominus + RT \ln(p_{SiO}/p^\ominus)^2 \cdot (p_{N_2}/p^\ominus)^{2/3} \qquad 2.42$$

From reaction 2.44, it can be shown that 1 mol $N_2$ and 3 mol SiO are produced at same time, that is $$p_{SiO}/p^\ominus = 3p_{N_2}/p^\ominus \text{ and}$$

$$\Delta_r G = \Delta_r G^\ominus + 2RT \ln 3 + RT \ln(p_{N_2}/p^\ominus)^{8/3} \qquad 2.43$$

and $$\Delta_r G = 931363 - 423.98T + RT \ln(p_{N_2}/p^\ominus)^{8/3} \qquad 2.44$$

are thus obtained.

If the production of gaseous SiO and $N_2$ is sufficient to break through the surface film of $SiO_2$, the sum of pressure of the two gases should be more than the atmospheric pressure, that is:

$$p_{SiO}/p^\ominus + p_{N_2}/p^\ominus = 1 \text{ and } p_{SiO}/p^\ominus = 3p_{N_2}/p^\ominus \qquad 2.45$$

So $p_{N_2}/p^\ominus = \frac{1}{4}$ is obtained and $$\Delta_r G = 931363 - 454.71T \qquad 2.46$$

is obtained.

Thus the transition temperature of $T = 2048.26$ K $= 1775.03°$ C. can be obtained. That is, when the temperature is higher than this value, the gases of SiO and $N_2$ can break through the surface film of $SiO_2$, and the composite material cannot be protected. But if the sintering temperature of the process is lower than 1500° C., the surface film produced can protect the so-coated particle.

Because the surface film is covered on the composite material, it is also influenced by SiC. Thus the expression $$SiC + 2SiO_2 = 3SiO(g) + CO(g) \qquad 2.47$$

wherein the transition temperature of $T = 2048$ K $= 1775°$ C. is obtained, which indicates the surface film of $SiO_2$ can protect the composite material.

Another situation regarding the effect of the producing $Si_2N_2O$ is likewise considered. When SiC exists, the oxygen partial pressure in the film is lower, and the possibility of producing $Si_2N_2O$ is greater.

$$2/3Si_3N_4 + SiO_2 = Si_2N_2O + SiO(g) + 1/3N_2(g)$$

$$\Delta_r G^\ominus = 375332 - 236.06T \qquad 2.48$$

$$\Delta_r G = \Delta_r G^\ominus + RT \ln(p_{SiO}/p^\ominus) \cdot (p_{N_2}/p^\ominus)^{1/3} \qquad 2.49$$

The reaction here is also that 1 mol $N_2$ and 3 mol SiO are produced at the same time, so $p_{SiO}/p^\ominus = 3p_{N_2}/p^\ominus$. The pressure which can break through the surface film is greater than atmospheric pressure, that is $p_{SiO}/p^\ominus + p_{N_2}/p^\ominus = 1$ and $p_{N_2}/p^\ominus = \frac{1}{4}$ is obtained, and thus $$\Delta_r G = 375332 - 241.46T \qquad 2.50$$

The transition temperature of $T = 1554.45$ K $= 1281.22°$ C. is obtained. That is, when $Si_2N_2O$ is produced, the gas pressure of SiO and $N_2$ produced can break through the surface film at a relatively low temperature. But the $Si_2N_2O$ can still form the protecting film. If the oxygen partial pressure is high enough to oxidize $Si_2N_2O$, then the protecting $SiO_2$ film is formed. This is also the basis of forming a $Si_2N_2O/Si_3N_4/SiC$ system.

The Sintering Process of Reverse Reaction Sintering $Si_3N_4/SiC$ Composites

The sintering process of reverse reaction sintering $Si_3N_4/SiC$ composites is actually the reaction process of controlling oxidation, by reacting to produce new and active $SiO_2$ and a little $Si_2N_2O$ which segregates onto the SiC and $Si_3N_4$ particle surfaces, thus aiding in sintering. Additionally, the presence of impurities, to some extent, may be regarded sintering aids; for example clay, metal Si, $SiO_2$, and the like, may further assist in sintering. The oxidation of reverse reaction sintering $Si_3N_4/SiC$ composites is a function of such factors as the reaction temperature, the sintering atmosphere, the composition of binding agent and crystal structure, the particle size of raw material, the particle size distribution of the system, and the like. In this process, $O_2$ is a diffusing phase, SiC and $Si_3N_4$ are solid phases, and the oxidation process is limited by the diffusion of $O_2$ to the particle interfaces and the diffusion of reaction products away therefrom. Oxygen diffuses to the surface of the SiC and $Si_3N_4$ particles and forms a film of $SiO_2$ thereupon. To further react with a given particle, oxygen must first diffuse through the $SiO_2$ film to reach the reaction interface; the oxidation reaction is thus limited by the diffusion of oxygen through the silica shells that form on the respective particles. Likewise, the gaseous reaction products, such as $CO_2$, CO, SiO, $N_2$ and NO, and the like, are emitted by reverse diffusion from the interface through the silica layer, which also influences the diffusion of oxygen therethrough to the interface.

The driving force of sintering is the surface energy (surface tension). The powder material is typically highly dispersed, and more typically is characterized by an extremely large specific surface area, and thus has relatively high surface energy. As systems have a tendency to achieve the state of lowest energy, the reduction of surface free energy is the main driving force of sintering the material. The difference between the surface energy ($\epsilon_b$) of powder particles and the interface energy ($\epsilon_s$) of crystal particles of multi-crystal sinter will result in the reduction of free energy of system, and the ratio $\epsilon_b/\epsilon_s$ is thus a measure of the sintering character of powder.

The first step of sintering process can be regarded as the compacting of the body formed of partially compacted particulate material, such as a mixture of SiC and $S_3N_4$ particles.

During the initial period (wherein the temperature is below 800 degrees Celsius), the body is heated in the air and a thin silica layer is formed around substantially all of the particles; the silica layer thus prevents further oxidation of the siliceous particles. As the temperature is increased, impurities in the raw material may be reacted with $SiO_2$ to produce a lower melting point eutectic material. Typically, the viscosity of eutectic liquid is relatively low and the particles making up the body may be redistributed by surface tension. The second step of sintering process is typically one of dissolving-diffusing-reseparating out.

During this step, the diffusion of $O_2$ through the silica layer limits the reaction rates. Due to the existence of the eutectic liquid, the speed of compacting the body is increased. After the particles are redistributed, they are separated by the thin liquid film. As the body densifies, the liquid separating the particles becomes quite thin. Typically, the thinner the liquid film, the greater the pressure of the particles. The solubility at the point of particles contacting is increased due to this pressure. The material at the contact points is gradually dissolved into the liquid, and then transferred to other surface and separated out.

The third step of sintering process is the process of grain growth. Due to the shrinkage/disappearance/closure of the pores, sintering speed is reduced but the microstructure of the material still continues to change. That is, other phenomena such as the grain growth, necking, and capillary action of liquid filing pores still continue to occur, but at slower rates. During the cooling process, the remaining interfacial liquid is hardened to glassy state or partially crystallized. If an exterior force is applied, the degree of compacting between the particles may be accelerated. As the thermodynamic equations illustrate, the sintering process is accompanied by the oxidation of $Si_3N_4$, which provides a continuous emission of $N_2$.

The Microstructure Analysis of Reverse Reaction Sintering $Si_3N_4$/SiC Composites The study on microstructure of reverse reaction sintering $Si_3N_4$/SiC composites includes the study on the structure of micro minerals and of micro pores. The surface area and inner area of sample P1, P2, P3 and P4 were analyzed by XRD, SEM and EPMA in order to confirm the microstructure of the sintered samples. The result of the analyses are as follows:

The Study on Microstructure of SiC—$Si_3N_4$ Sintering System

| Raw Materials | Particle Size(mm) | Sample # P1 (weight %) | Sample # P2 | Sample # P3 |
|---|---|---|---|---|
| SiC | 2.8-0.9 | 35 | 35 | 30 |
|  | 0.9-0.15 | 30 | 30 | 30 |
|  | 0.115 | 5 | 5 | 5 |
|  | 0.063 | 5 |  |  |
|  | 0.045 | 10 | 10 | 10 |
| $Si_3N_4$ | 0.088 | 15 | 15 | 15 |
| $SiO_2$ |  |  |  | 10 |
| Si |  |  | 5 |  |

Figure 6:
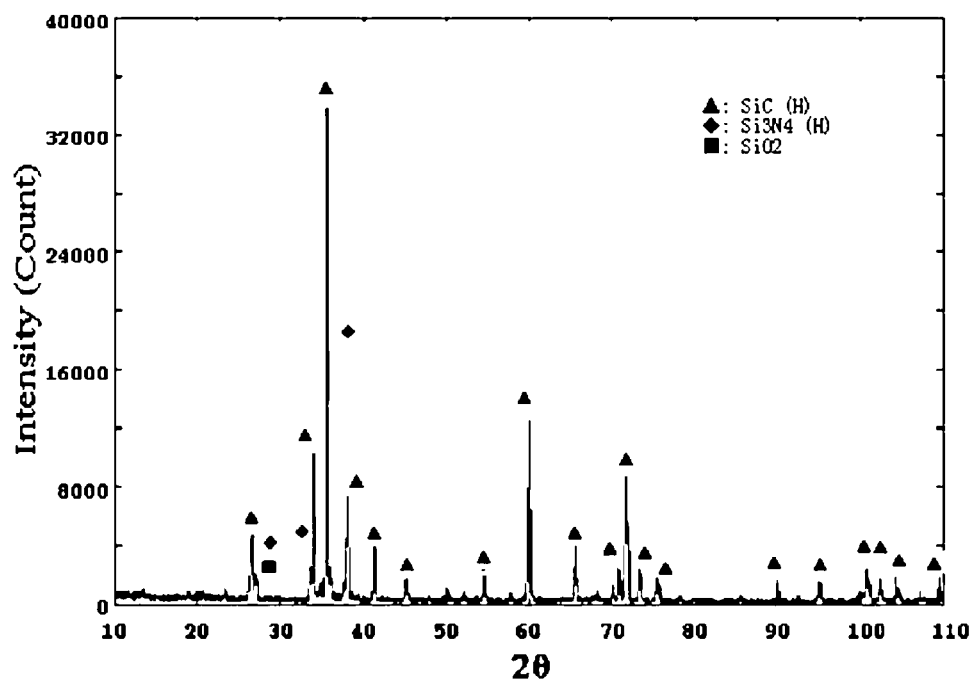
FIG. 6 is an X-Ray diffraction pattern taken of the as-sintered surface of $SiC/Si_3N_4$ composite sample P1 prepared according to a first embodiment of the present invention.
Figure 7:
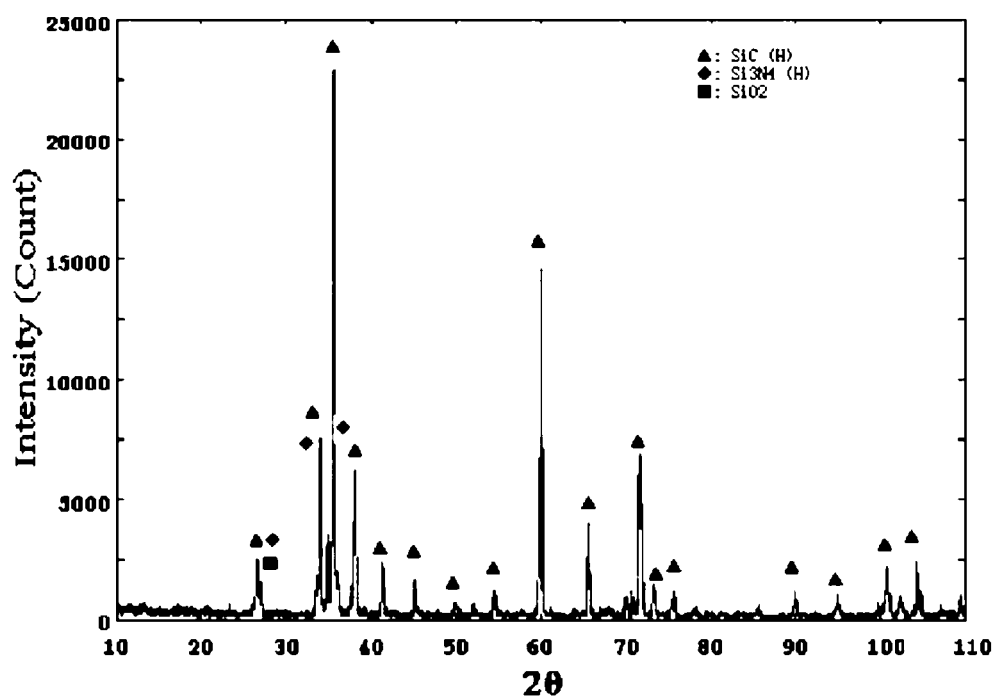
FIG. 7 is an X-Ray diffraction pattern taken of the interior of sample P1.

Sample P1 was analyzed by XRD and SEM. FIGS. 6 and 7 are surface area (0-5 mm) and inner area (8-16 mm) XRD patterns, respectively. The samples were prepared by mixing the constituent powders and forming them into green bodies. This was done by pressing at about 105 MPa; some samples required small amounts of binder (dextrine solution) to allow pressing. The green bodies were dried at 105 degrees Celsius for 10 hours. The green bodies were then heated at a rate of 50 degrees Celsius/hour to about 800 degrees Celsius, where they were allowed to soak for 8 to 10 hours. The samples were then heated at a rate of 50 degrees Celsius/hour to about 1450 degrees Celsius, where they were allowed to soak for 5 hours. The samples were then cooled to room temperature. All sintering was done in air under normal atmospheric pressures.

FIG. 6 shows that the surface sample of P1 is one of 0-5 mm area and its main crystal phases are SiC, $Si_3N_4$ and $SiO_2$. FIG. 7 shows that the interior of sample of P1 is mainly composed of SiC, $Si_3N_4$ and $SiO_2$, but with more $Si_3N_4$ and less $SiO_2$ than at the surface. Thus, the sintering and oxidation of the system without a sintering agent yields SiC and $Si_3N_4$ dispersed in a primarily silica matrix.

Figure 8:
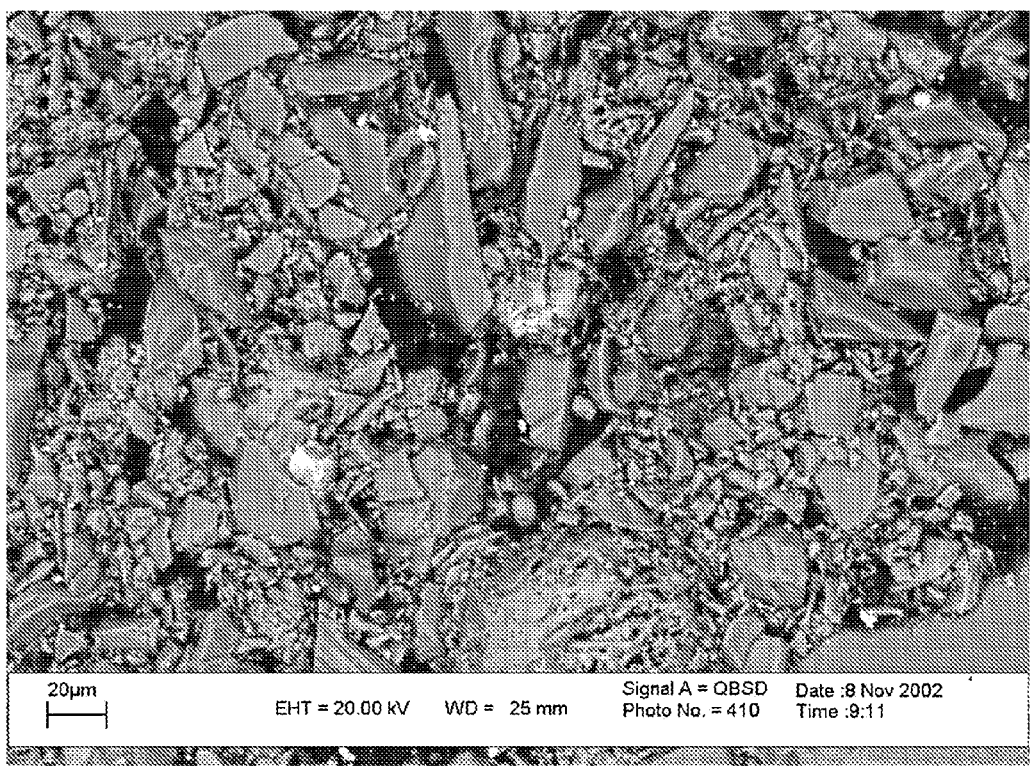
FIG. 8 is an SEM photomicrograph of sample P1.
Figure 9:
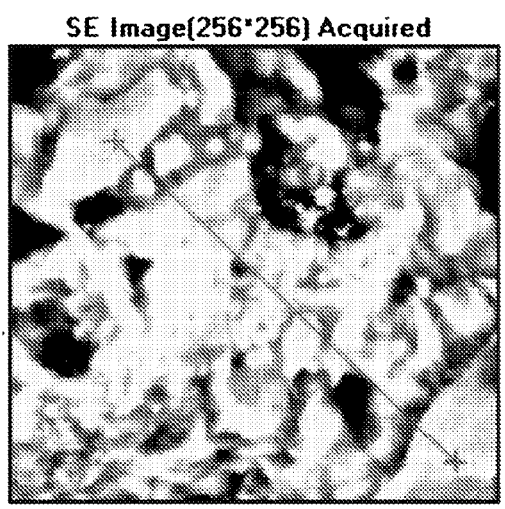
FIG. 9 is a graphic representation of an n ESA analysis of sample P1.
Figure 9:
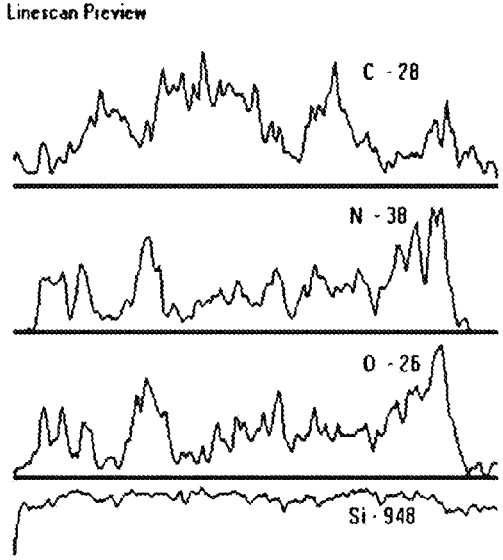

FIGS. 8 and 9 relate to a nitrogen-containing oxide found in the section of sample P1 and its morphology. SEM and ESA show the existence of nitride in the state of conglomerate, indicating that $Si_2N_2O$ is produced during the oxidation of $Si_3N_4$. The absence of the primary peak for $Si_2N_2O$ in XRD pattern indicates that either the amount of $Si_2N_2O$ present is relatively small, the $Si_2N_2O$ is amorphous or glassy, or the $Si_2N_2O$ crystal structure includes sufficient impurities so as to be substantially distorted.

Thus, if no any sintering agent is added when the SiC—$Si_3N_4$ powder is sintered, the main oxidation products produced during sintering are $SiO_2$ and a little $Si_2N_2O$. Thus, the oxidation sintering reaction of the system progresses and $Si_3N_4$ is substantially oxidized. Typically, the amount of $SiO_2$ in the matrix of system is kept below a predetermined threshold value, since excess silica can degrade the durability of the sintered body. Erosion testing of the P1 sample in cryolite-sodium fluoride melt in an electrobath of aluminum demonstrated that the amount of silica was not in excess, as the sintered P1 sample still had the property of preventing penetration and melt wetting resistance characteristic of sintered Si3N4/SiC composite materials.

The Study on Microstructure of $SN_4$—SiC—Si Sintering System

Figure 10:
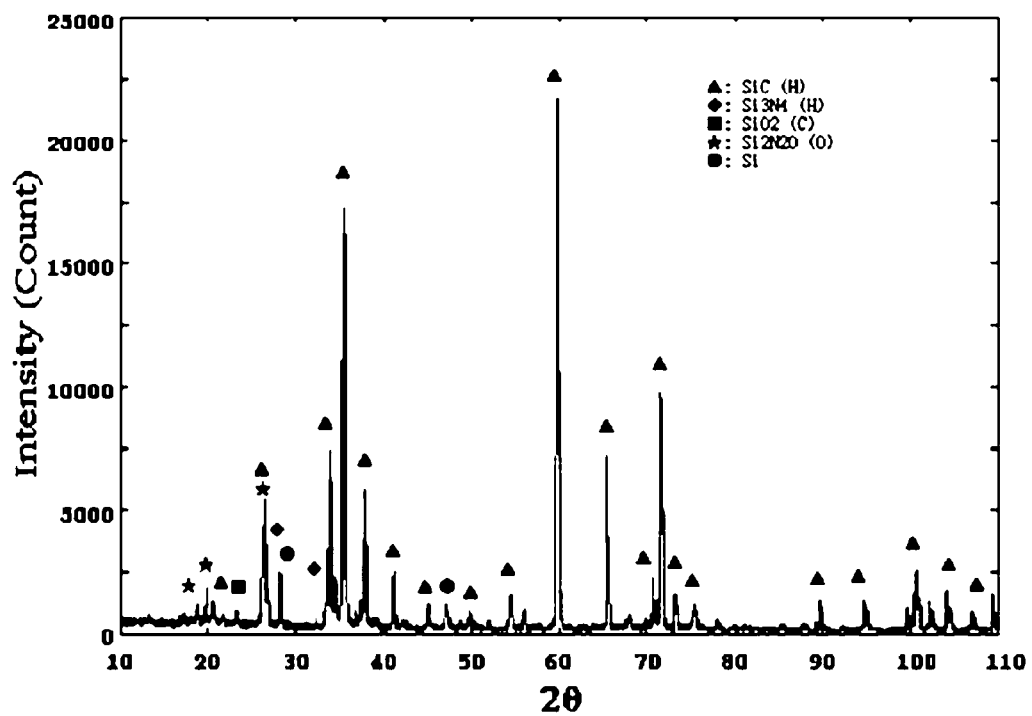
FIG. 10 is an X-Ray diffraction pattern taken of the as-sintered surface of $SiC/Si_3N_4$ composite sample P2 prepared according to a first embodiment of the present invention.
Figure 11:
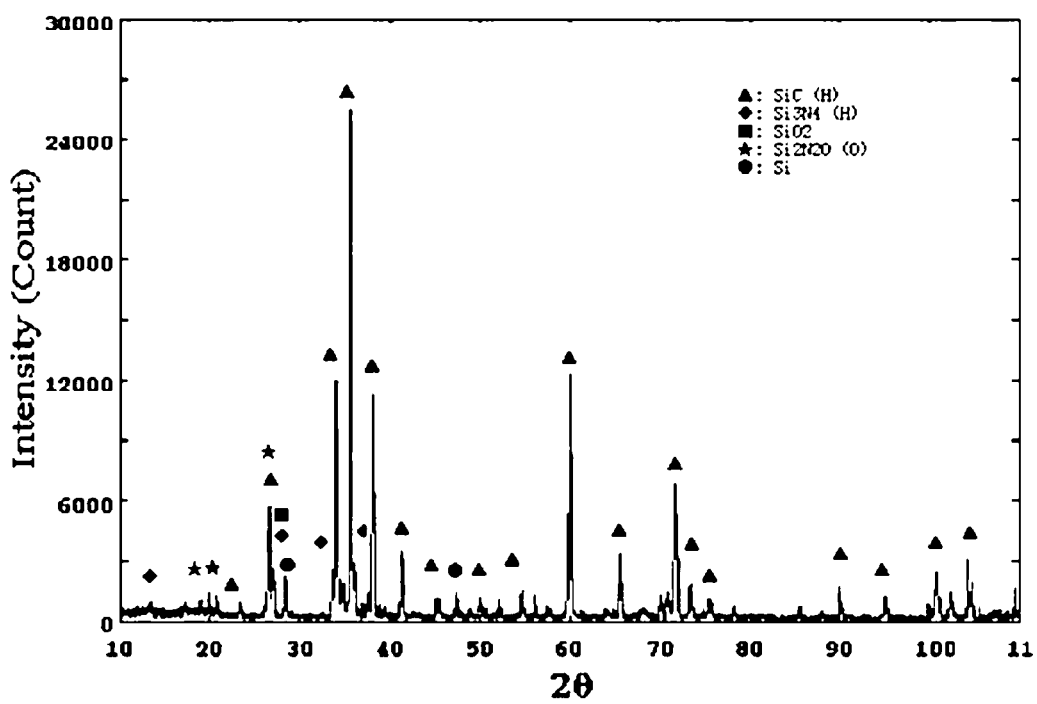
FIG. 11 is an X-Ray diffraction pattern taken of the interior of sample P2.

Sample P2 was analyzed by XRD and EPMA; the results are presented as FIGS. 10 and 11, and are of the surface (0-5 mm) and interior area (8-16 mm), respectively. As can be seen from FIGS. 10 and 11, metallic silicon is present in the sintered matrix of P2. The oxidation products of sintering are $Si_2N_2O$ and a little $SiO_2$; the main crystal phases are hexagonal SiC and $Si_3N_4$. But compared with the X-ray patterns of the surface and inner area of P2, it can be seen that the content of crystal phase of $Si_2N_2O$ and $SiO_2$ in the surface area (FIG. 10) of the sample are relatively high (compared with the peak strength). Metallic silicon still exists in the surface area (FIG. 10). There is relatively little $Si_2N_2O$ crystal phase present in the inner area (FIG. 11) is little.

Figure 12:
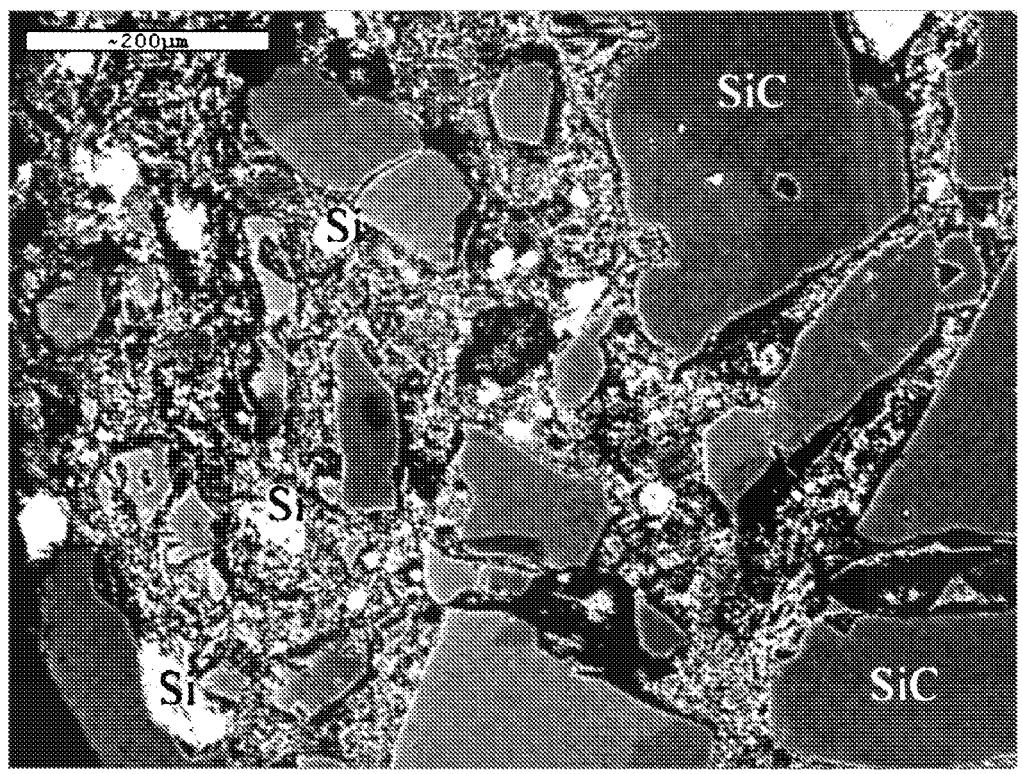
FIG. 12 is a first SEM photomicrograph of the surface region of sample P2.
Figure 13:
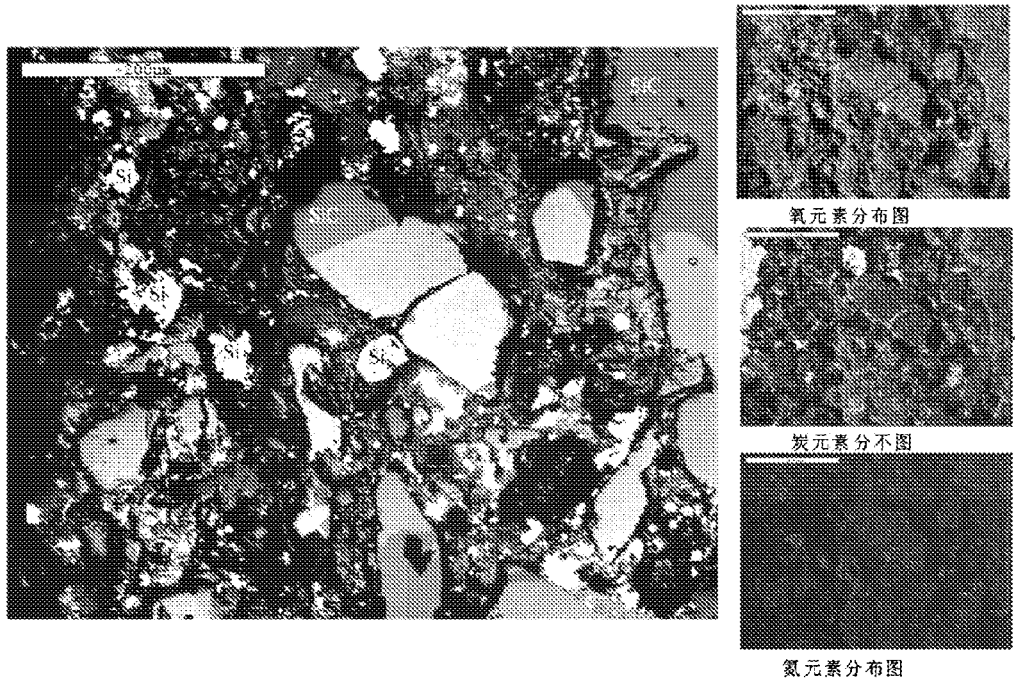
FIG. 13 is a second SEM photomicrograph of a pore of sample P2.

Electron microprobe analysis results for sample P2 are shown in FIGS. 12 and 13. Turning to FIG. 12, the surface area of P2 the distribution of metallic silicon, with the diameter of the silicon particles being less than about 50 μm; the metallic silicon particles are distributed in the among of coarse SiC particles, which indicates that metallic silicon in the surface area has not been disappeared totally after being sintered at the relatively high temperature of 1450 degrees Celsius. In addition, there is obvious chromatic aberration in the surface area along the pores extending below the surface (see FIG. 13). Comparison of the distribution of O, C and N indicates that the surface of the particles have an area of high oxygen content. Thus, the reaction of oxygen diffusing toward surrounding area occurs around the pores.

Figure 14:
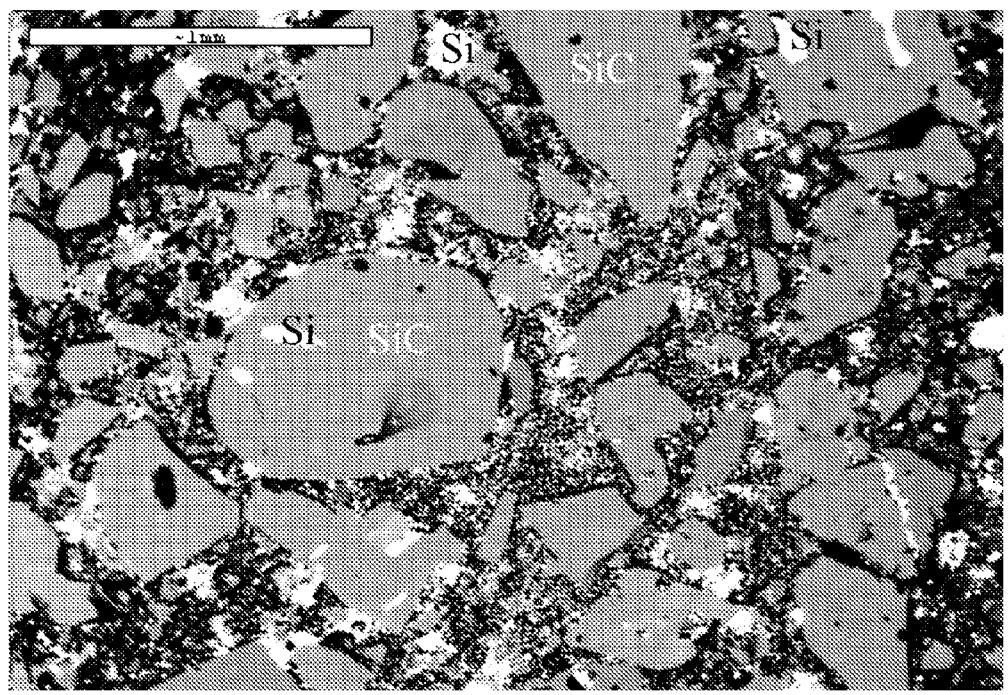
FIG. 14 is a first SEM photomicrograph of the interior of sample P2.

FIG. 14 illustrates the interior area (8-16 mm) morphology of sample P2, and shows that the content of metallic silicon in the inner area is relatively greater and concentrated in the voids of SiC. Such distribution appears to be beneficial to the oxidation resistance of SiC and thus improves the binding strength. Apparently, metallic silicon is melted into the SiC voids and acts as a binder.

Figure 15:
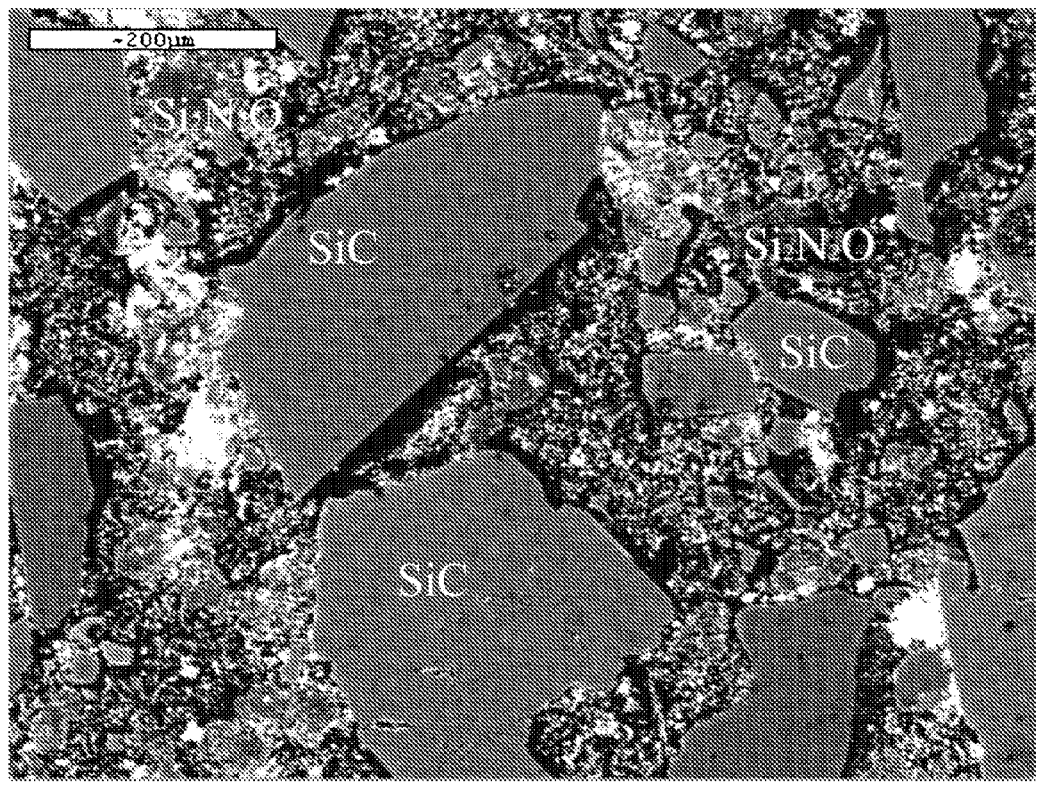
FIG. 15 is a second SEM photomicrograph of the interior of sample P2.

FIG. 15 illustrates the $Si_2N_2O$ mineral morphology in inner area (8-18 mm) of sample P2. Significant $Si_2N_2O$ is present in the interior area of sample P2. $Si_2N_2O$ is present on the surface of grains $Si_3N_4$ as short, cylinder crystals. Further, silica has precipitated in the surrounding area. Inner oxidation of pores is also be observed, and the oxidation process extends toward the sample interior along the void surface area. SiO produced by oxidation is precipitated onto the surface due to total oxidation of exterior surface, which prevents further oxidation. The $Si_2N_2O$ crystal morphology is not as obvious, and the $Si_2N_2O$ crystals seem to grow finer. So the ratio of remnant nitrogen is high and the strength of the sintered P2 sample was high as well. The X-ray pattern confirms the presence of $Si_2N_2O$. And it is probable that the oxygen diffused into the matrix reacts preferentially with metallic silicon.

So, the metal silicon (surface and inner area) in the sample matrix is not totally oxidation during the sintering of the $SiC$—$Si_3N_4$ sample. The metallic silicon apparently infiltrates into the void of the SiC crystals at the sintering temperature and acts in a binding role, likely as a plastic phase. Meanwhile, metallic silicon reacts more easily with oxygen than does $Si_3N_4$, so the formation of a $Si_2N_2O$ phase is not observed, and thus more $Si_3N_4$ is present after the sample is sintered. The sample thus produced has better chemical durability characteristics, which were confirmed by the erosion test of cryolite-sodium fluoride melt test.

The Study on Microstructure of $Si_3N_4$—SiC—$SiO_2$ Sintering System

Figure 16:
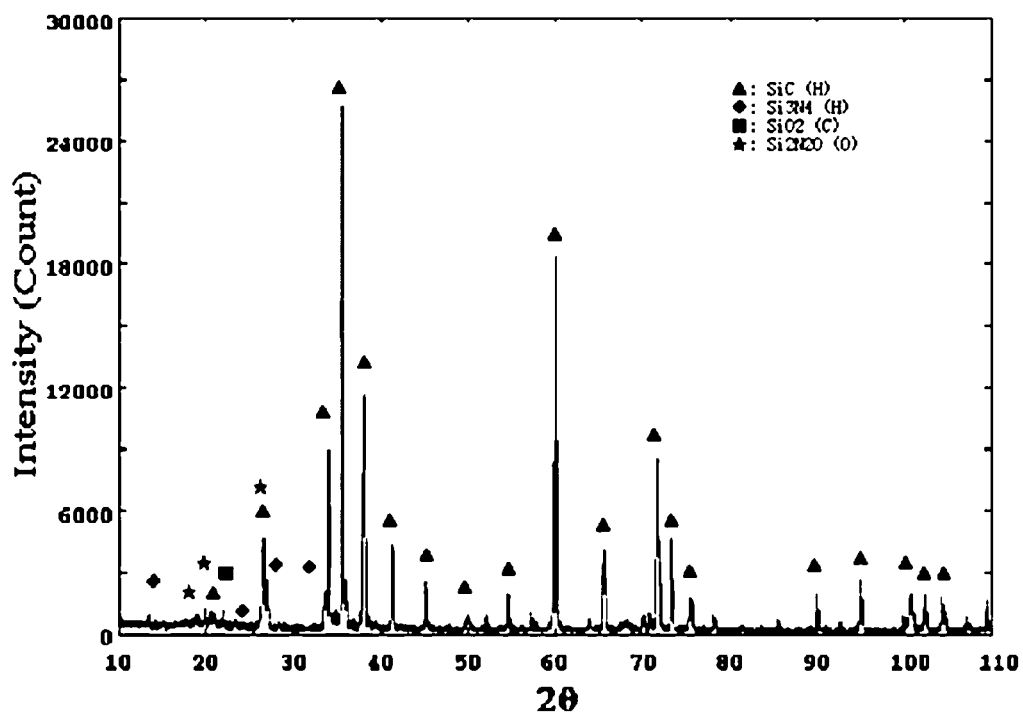
FIG. 16 is an X-Ray diffraction pattern taken of the as-sintered surface of $SiC/Si_3N_4$ composite sample P3 prepared according to a first embodiment of the present invention.
Figure 17:
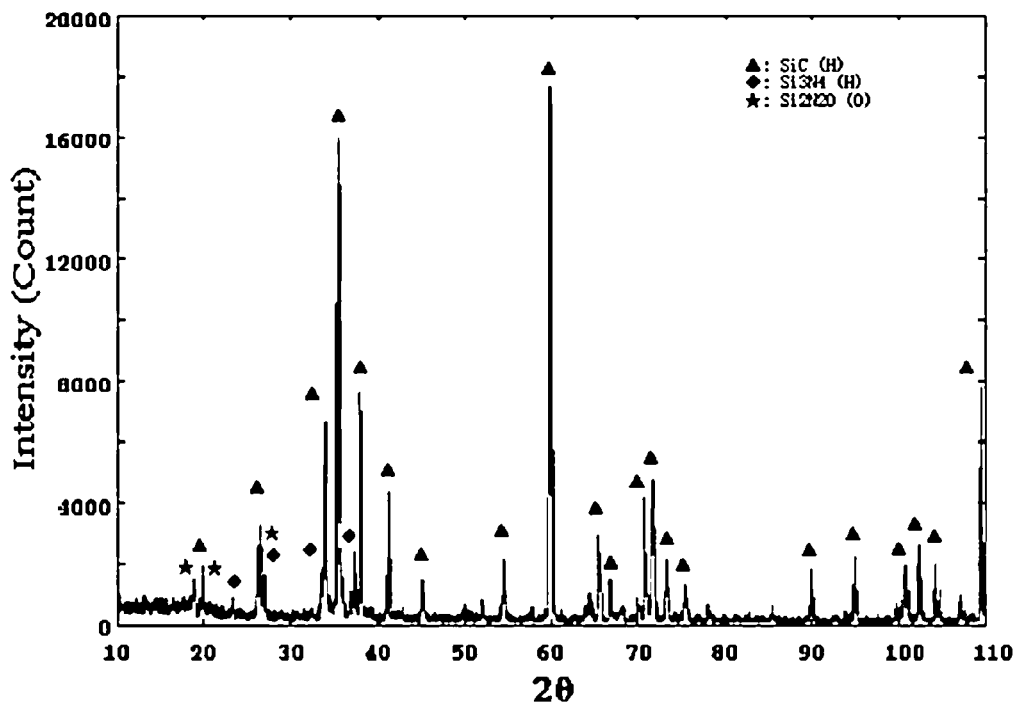
FIG. 17 is an X-Ray diffraction pattern taken of the interior of sample P3.

Sample P3 was analyzed by XRD and EPMA. FIGS. 16 and 17 show the exterior surface area and inner area XRD pattern for sample P3, respectively. Sample P3 was produced by sintering $SiC$—$Si_3N_4$ in the presence of $SiO_2$. The analysis sample P3 shows that the main phases are SiC and $Si_3N_4$, but the content of $Si_2N_2O$ in the surface area of the binding phase is less than that of the inner area (comparison of peak strength). The $SiO_2$ phase in the surface area is relatively high (comparison of peak strength) compared to that of the inner area (significant amounts of $SiO_2$ were not observed in X-ray pattern). In addition, the primary peak of $Si_2N_2O$ mineral was detected both on surface and interior of the P3 sample, indicating that the $Si_2N_2O$ content was higher and $SiO_2$ may be present in an amorphous or glassy state; if so, the structure is suited for use in a thermal shock resistance environment.

Figure 18:
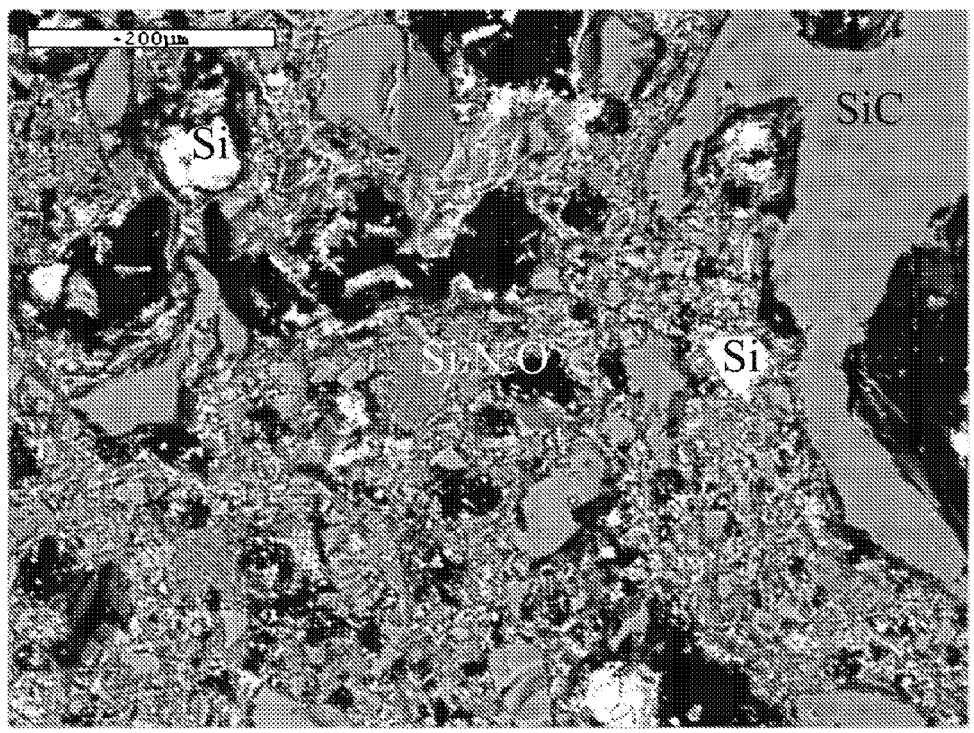
FIG. 18 is a first SEM photomicrograph of the surface region of sample P3.
Figure 19:
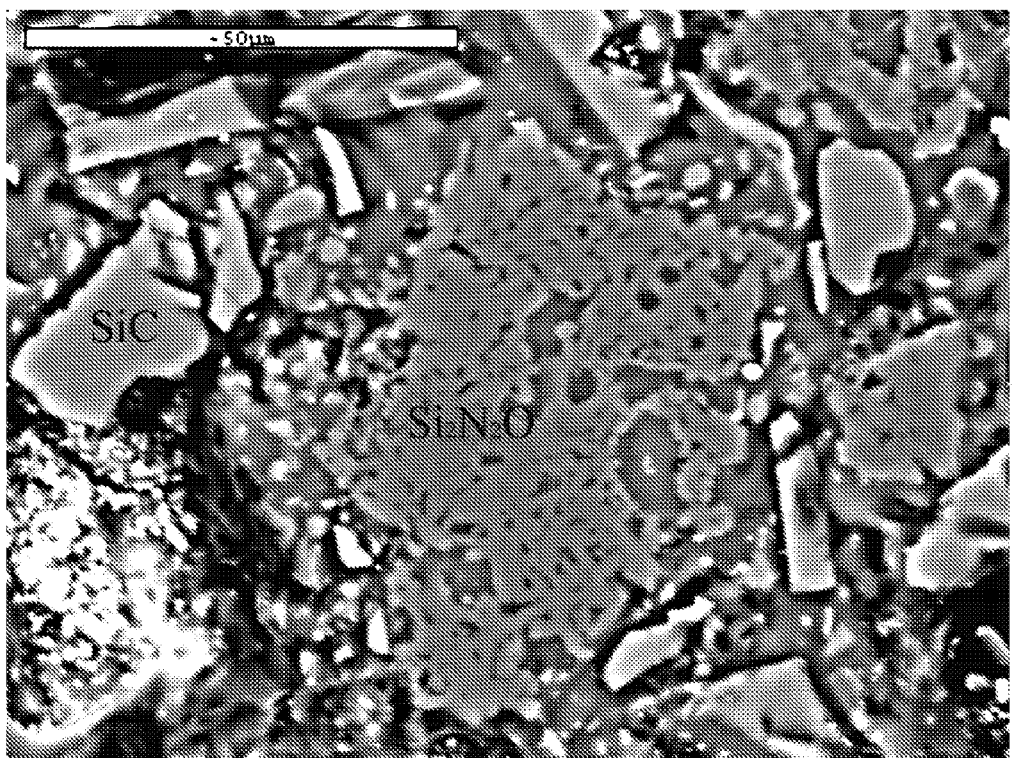
FIG. 19 is a second SEM photomicrograph of a surface region of sample P3.
Figure 20:
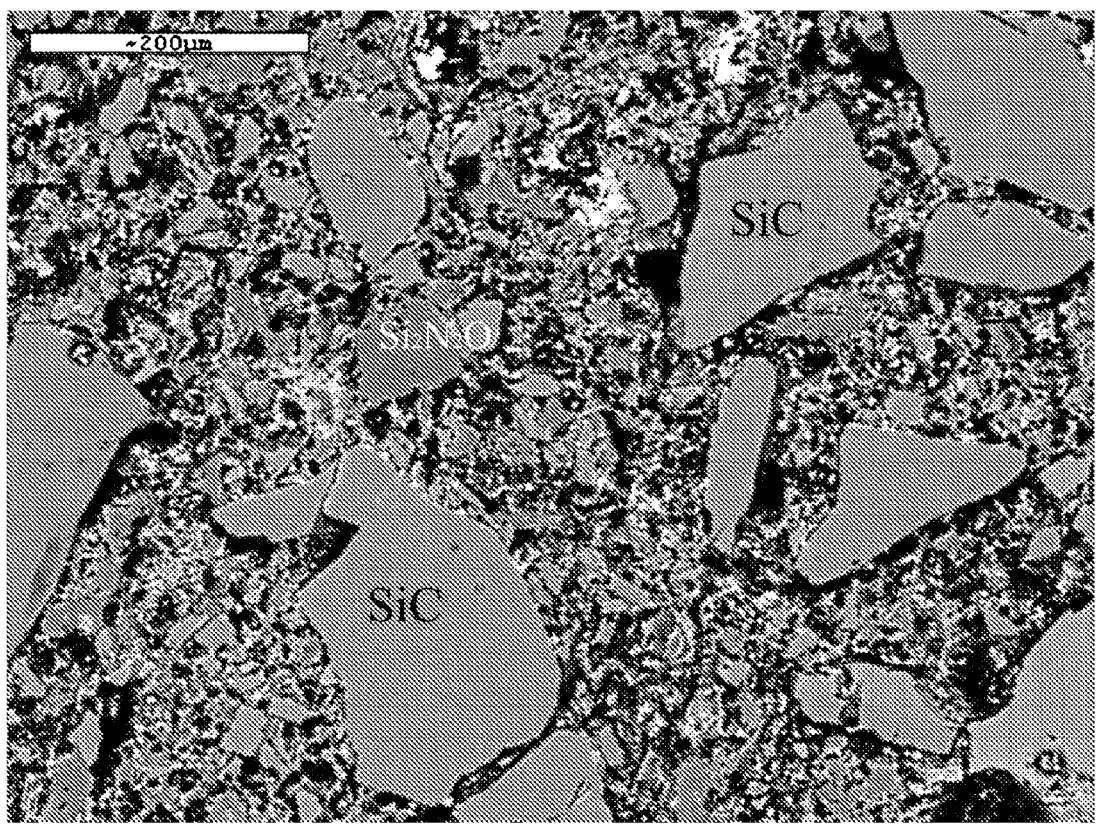
FIG. 20 is a first SEM photomicrograph of the interior of sample P3.

FIG. 18 is surface EPMA pattern of sample P3; FIG. 19 is surface area $Si_2N_2O$ morphology of sample P3; and FIG. 20 is interior area (8-16 m) morphology of sample P3. The analysis of FIG. 18 shows that the oxidation product of $Si_3N_4$ on the surface is $Si_2N_2O$ and $SiO_2$, and the crystal grows very well (seeing FIG. 19). Meanwhile, $Si_3N_4$ here may be covered by $SiO_2$ and $Si_2N_2O$ and thus cannot be detected. FIG. 20 shows that $Si_2N_2O$ crystal from the oxidation of $Si_3N_4$ are very fine; this may be an effect of the speed of gas diffusion through the silica layer.

To sum, by sintering the product of $SiC$—$Si_3N_4$ in the presence of $SiO_2$, the process of oxidation in the surface area is relatively smooth, as the oxidation of $Si_3N_4$ is carried out in the presence of a superfine $SiO_2$ layer. The existence of the superfine $SiO_2$ layer reduces or prevents the gas diffusion, and makes the oxidation of $Si_3N_4$ in the body interior incomplete and thus the size of the remaining $Si_3N_4$ crystals/grains is typically fine and small. As a whole, $Si_3N_4$ in the interior portion of the $SiC$—$Si_3N_4$ sintered body containing the superfines of $SiO_2$ is at least partially oxidized and thus more $Si_2N_2O$ biproduct is produced. The body has enhanced physical and mechanical properties. A body produced similarly to the P3 sample was thermally cycled in a tunnel kiln 220 times without cracking, a longer life than typical for $SiO_2$ bodies under the same conditions.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A substantially dense sintered body comprising:
   silicon carbide grains;
   a $SiO_2/Si_2N_2O$ matrix; and
   silicon nitride grains substantially evenly distributed throughout the $SiO_2/Si_2N_2O$ matrix;
   wherein the silicon nitride grains are substantially finer than the silicon carbide grains;
   wherein the silicon carbide grains are substantially evenly distributed throughout the $SiO_2/Si_2N_2O$ matrix;
   wherein the silicon carbide grains have a substantially narrow particle size distribution; and
   wherein the silicon nitride grains are disposed within respective thin substantially silicon dioxide outer shells.

2. A sintered body, comprising:
   a matrix including a mixture of $SiO_2$ and $Si_2N_2O$;
   a plurality of SiC grains dispersed in the matrix; and
   a plurality of $Si_3N_4$ grains dispersed in the matrix;
   wherein substantially all of the SiC and $Si_3N_4$ grains are disposed within respective vitreous shells.

3. The sintered body of claim 2 wherein the respective vitreous shells are substantially $SiO_2$.

4. The sintered body of claim 2 wherein the respective vitreous shells are substantially a mixture of $SiO_2$ and $Si_2N_2O$.

5. The sintered body of claim 2 and further including metallic Si dispersed in the matrix.

6. The sintered body of claim 5 wherein the metallic Si is present on the surfaces of at least some of the SiC grains.

7. The sintered body of claim 5 wherein the Si is present in at least some of the SiC grains.

8. The sintered body of claim 2 wherein at least some of the $Si_2N_2O$ is crystallized.

9. The sintered body of claim 8 wherein at least some of the $Si_2N_2O$ has the form of crystals disposed on the surfaces of $Si_3N_4$ grains.

10. A densified body, comprising:
    a substantially silica matrix;
    a plurality of SiC grains dispersed in the matrix;
    a plurality of $Si_3N_4$ grains dispersed in the matrix; and
    a plurality of $Si_2N_2O$ crystals;
    wherein substantially all of the SiC and $Si_3N_4$ grains are disposed within respective substantially silica shells.

11. The densified body of claim 10 wherein the respective substantially silica shells are substantially vitreous.

12. The densified body of claim 10 wherein the $Si_2N_2O$ crystals are generally located on the surfaces of the $Si_3N_4$ grains.

13. The densified body of claim 10 and further comprising metallic silicon distributed throughout the densified body.

14. The densified body of claim 13 wherein at least some of the SIC grains include voids and wherein the metallic silicon is disposed within at least some of the voids.

* * * * *